Sept. 9, 1924.                M. J. FURLONG                1,507,995
                                  VEHICLE
                             Filed July 3, 1923
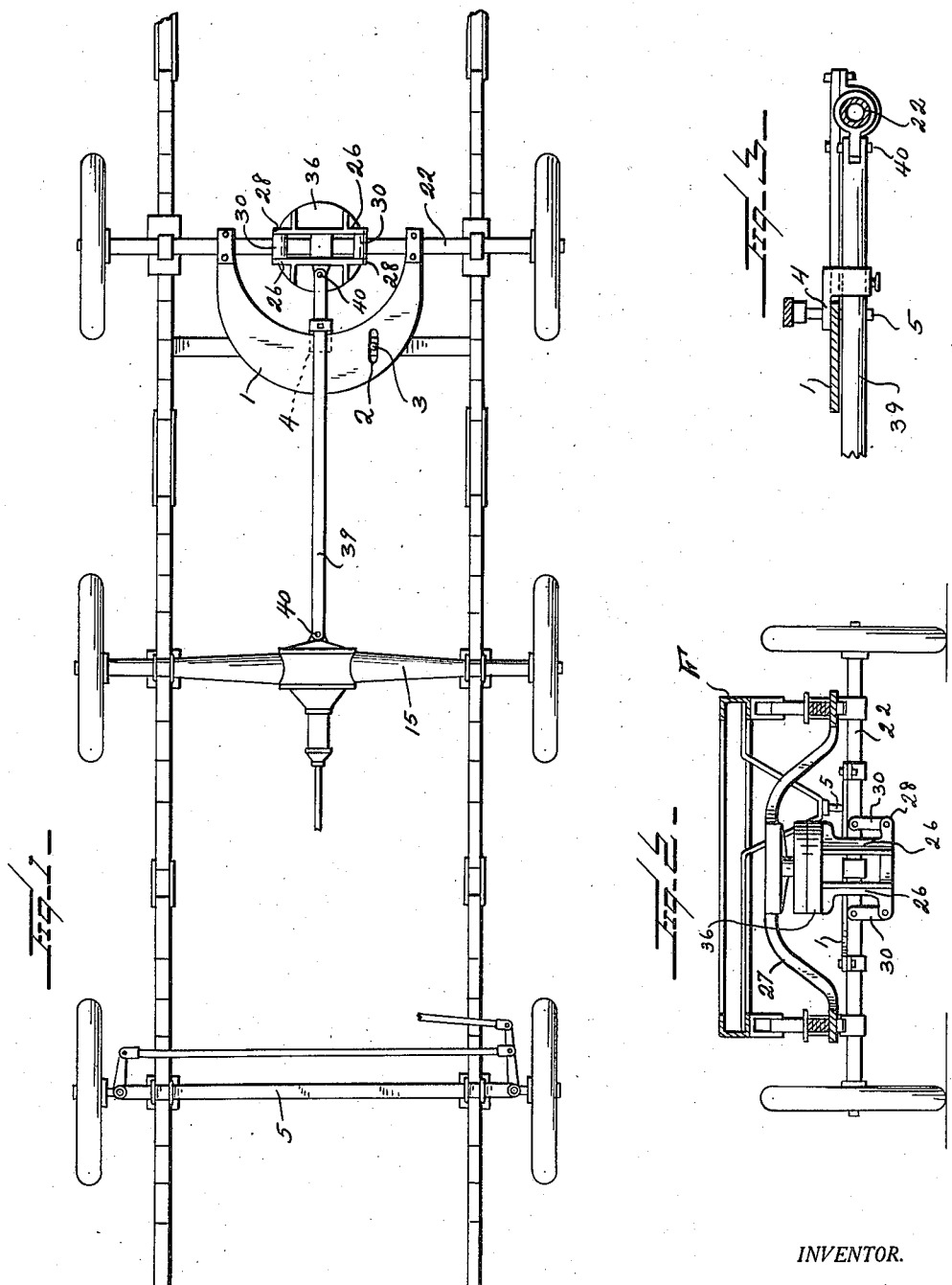
INVENTOR.
M. J. Furlong
BY Watson E. Coleman
ATTORNEY.

Patented Sept. 9, 1924.

1,507,995

UNITED STATES PATENT OFFICE.

MARTIN J. FURLONG, OF HOUSTON, TEXAS.

VEHICLE.

Application filed July 3, 1923. Serial No. 649,303.

*To all whom it may concern:*

Be it known that I, MARTIN J. FURLONG, a citizen of the United States, residing at Houston, in the county of Harris and State of Texas, have invented certain new and useful Improvements in Vehicles, of which the following is a specification, reference being had to the accompanying drawings.

This invention relates to certain improvements in vehicles and especially relates to a wheel base whereby a materially long body may be comprised in the vehicle and it is an object of the invention to provide novel and improved means whereby the steering of the vehicle is facilitated.

Furthermore it is an object of the invention to provide a novel and improved device of this general character wherein the frame or body of the vehicle is associated with the running gear in a manner whereby lateral swinging movement of the frame or body of the vehicle occurring while the vehicle is being turned or changing its direction of travel operates to cause one of the axles of the running gear to change its angularity to facilitate the steering of the vehicle.

The invention consists in the details of construction and in the combination and arrangement of the several parts of my improved vehicle whereby certain important advantages are attained and the device rendered simpler, less expensive and otherwise more convenient and advantageous for use, as will be hereinafter more fully set forth.

The novel features of my invention will hereinafter be definitely claimed.

In order that my invention may be the better understood, I will now proceed to describe the same with reference to the accompanying drawings, wherein:—

Figure 1 is a fragmentary view in top plan and of a somewhat diagrammatic character illustrating an embodiment of my invention, the frame or body being omitted;

Figure 2 is a transverse sectional view looking through the rear portion of the structure as illustrated in Figure 1; and Figure 3 is a fragmentary view partly in side elevation and partly in section illustrating the means herein disclosed for operatively connecting the pull rod and the radius brace plate.

As disclosed in the accompanying drawings, F denotes the frame or body of a vehicle having associated therewith a front axle 5, the transversely disposed casing 1 for the conventional driving axles and the rear axle 22, each of which being operatively engaged with the frame or body F in substantially the same manner as particularly set forth in my Patent No. 1,454,162 dated May 8, 1923.

The rear axle 22 and the casing 15 are operatively connected by the pull rod 39 each connection 40 being pivotal with the axis of such connection vertically disposed. The rear axle 22 is adapted to have bodily swinging movement in a manner to be hereinafter particularly referred to.

The shaft 22 is disposed between depending arms 26 carried by the swinging saddle member 36 operatively supported by the saddle 27. Each pair of arms 26 is positioned to one side of the axial center of the saddle 27 and the lower portions thereof are provided with the outwardly disposed extensions 28 between each pair of which is pivotally connected a hanger 30, said hanger being also pivotally connected with the axle 22. The connections afforded by the hangers 30 permit the frame or body F to swing off of the central line in order to permit the casing 15 to change its angularity to control the desired swinging movement of the shaft 22.

Secured to the shaft 22 at points equidistantly spaced from the axial center of the saddle member 36 are the extremities of a forwardly directed radius brace plate 1 which overlies the pull rod 39 but is positioned in relative close priximity thereto. The plate 1 to one side of its center is provided with the slot 2 disposed in parallelism with the pull rod 39 when the axle 22 is in straight ahead position and extending within but through the slot 2 is a pin or member 3 operatively connected to the frame or body F and having a fixed position with respect thereto.

When the vehicle is making a turn, the resultant side movement or play of the rear portion of the frame or body F will result in the pin 3 through the instrumentality of the radius brace plate 1 to impart bodily swinging movement to the shaft 22 in a direction opposite to that of the turning movement of the vertical end portion of the vehicle whereby the turning or steering operation is materially facilitated whereby the rear portion of the frame or body F will travel in substantially the same path as the forward portion of the body.

Secured to the pull rod 39 inwardly of the plate 1 is a clip or plate 4 extending over the adjacent marginal portion of the plate 1 whereby the plate 1 is held against rising but is free to move. It is to be understood that the inner or rear edge of the plate 1 is disposed on a curvature concentric to the axis of the saddle 36.

While I have hereinbefore particularly referred to the shaft 22, a casing is to be understood as coming within the terms thereof as well as any other structure which serves for the same general purpose.

From the foregoing description it is thought to be obvious that a vehicle constructed in accordance with my invention is particularly well adapted for use by reason of the convenience and facility with which it may be assembled and operated, and it will also be obvious that my invention is susceptible of some change and modification without departing from the principles and spirit thereof and for this reason I do not wish to be understood as limiting myself to the precise arrangement and formation of the several parts herein shown in carrying out my invention in practice except as hereinafter claimed.

I claim:—

1. A vehicle comprising a frame, an axle operatively supported by the frame for bodily swinging movement about a vertical axis, said frame having relative lateral movement with respect to the axle, a forwardly directed plate carried by the axle and provided with a slot, and a member fixed with respect to the frame and disposed through the slot, whereby relative lateral movement between the frame and axle will impart swinging movement to the axle.

2. A vehicle comprising a frame, an axle operatively supported by the frame for bodly swinging movement about a vertical axis, said frame having relative lateral movement with respect to the axle, a forwardly directed plate carried by the axle and provided with a slot, a member fixed with respect to the frame and disposed through the slot whereby relative lateral movement between the frame and axle will impart swinging movement to the axle, a pull rod operatively engaged with the axle, and means carried by the pull rod and engaging with the member to hold the member against rising.

3. A vehicle comprising a frame, an axle operatively supported by the frame for bodily swinging movement about a vertical axis, said frame having relative lateral movement with respect to the axle, coacting means carried by the body and axle operating upon the relative lateral movement between the frame and axle to impart swinging movement to the axle, a radius brace plate having its extremities secured to the axle at the opposite sides of its axis, said plate being provided with a slot disposed lengthwise of the frame when the axle is in straight ahead position, and a member fixed with respect to the body and extending within the slot.

4. A vehicle comprising a frame, an axle operatively supported by the frame for bodily swinging movement about a vertical axis, said frame having relative lateral movement with respect to the axle, coacting means carried by the body and axle operating upon the relative lateral movement between the frame and axle to impart swinging movement to the axle, a radius brace plate having its extremities secured to the axle at the opposite sides of its axis, said plate being provided with a slot disposed lengthwise of the frame when the axle is in straight ahead position, a member fixed with respect to the body and extending within the slot, the inner edge of the plate being concentric to the axis of the axle, a pull rod operatively engaged with the axle, and a member carried by the pull rod and overlying the inner marginal portion of the plate to hold the same from rising.

In testimony whereof I hereunto affix my signature.

MARTIN J. FURLONG.